Sept. 6, 1927.

J. A. BALL 1,641,566

METHOD OF MAKING COMPOSITE COLOR PICTURES

Filed Sept. 16, 1926    3 Sheets-Sheet 1

Inventor
Joseph A. Ball
Attorney

Sept. 6, 1927.
J. A. BALL
1,641,566
METHOD OF MAKING COMPOSITE COLOR PICTURES
Filed Sept. 16, 1926
3 Sheets-Sheet 2

Inventor
Joseph A. Ball
Attorney.

Patented Sept. 6, 1927.

1,641,566

UNITED STATES PATENT OFFICE.

JOSEPH A. BALL, OF LOS ANGELES, CALIFORNIA, ASSIGNOR TO TECHNICOLOR MOTION PICTURE CORPORATION, OF BOSTON, MASSACHUSETTS, A CORPORATION OF MAINE.

METHOD OF MAKING COMPOSITE COLOR PICTURES.

Application filed September 16, 1926. Serial No. 135,727.

This invention has to do with the production of composite pictures (specifically, although not necessarily, motion pictures), which will reproduce a composite object field more or less accurately in natural colors.

The art of producing composite motion pictures has been more or less successfully applied to and practiced with regard to black and white pictures, typical methods involving the taking of what may be termed a background negative and also what may be termed an action negative, and then combining the images of the action with the images of the background so that the action shall then appear to have taken place before the background. By suitable methods any two images which have been taken on separately exposed negatives can be combined, but, to facilitate the description of the present invention, it will be assumed, without limitation, that the two negatives to be combined are, respectively, a negative of a background and a negative of an action.

The method most ordinarily employed for combining two such negatives may be briefly described as follows: The background negative may be taken at any time or place. The action negative is taken at any time or place, but is usually taken before a black or nonactinic ground so that the resulting action negative when developed will show images of the action in a substantially transparent field. From this action negative a positive is made, the positive showing a positive image of the action in a substantially opaque field. Then what is termed a negative mat is made, either by suitable treatment of the original action negative or by suitable treatment of another negative made from the action positive. Such negative mat may be made from the action positive by suitable overdeveloping, the result being a substantially opaque silhouette of the action image in a substantially transparent field. Or the negative mat may be made, for instance, by opaqueing either action negative by hand with suitable opaque pigment.

Then a print is made from a positive of the background negative onto a fresh negative with the negative action mat interposed; so that the fresh negative is exposed and a latent background image produced in all parts of that negative except the part covered by the opaque silhouette image of the action in the negative mat. Then before development this partially exposed negative is printed upon from the action positive, which prints the positive image into the part previously unexposed. The completely exposed negative when developed then has a composite image that shows the action as if it had actually taken place in front of the selected background.

The foregoing description involves only two original films exposed to two scenes; but it will be readily recognized that there may be a third which may be combined in the same manner with the composite of the first two; and thus any number of scenes may be composed.

Color pictures are also well known to the art. The type of color pictures concerned in this invention are those in which a film, or complemental films, carry two or more series of images representing two or more different color aspects of an object field. Although the invention will be seen not to be limited to any specific type or specific kind of such color motion pictures, or to a film carrying only two series of complemental color record images, the invention will be explained in typical and illustrative form as applied to those color motion pictures known in the art as "technicolor." Specifically, in such pictures, an original negative film is exposed through suitable color filters to the same object field in such a manner that the film, when developed, carries two series of images representing respectively two color aspects of the object field. For the purpose of the following explanation the two color records thus obtained may be referred to as blue and red, although that definition is not technically accurate. In the present typical form of such "technicolor" pictures a single original negative film strip is so exposed that alternate images are records of red and blue, respectively; and the arrangement of the images is made such that adjacent red and blue record images form a pair or set which are symmetrically arranged in all respects with reference to what may be termed a registration axis transverse of the film.

Various methods are known for finally combining and coloring the corresponding blue and red record images for final projection, by either the additive or subtractive method and either before or during such final projection; but the methods used in the "technicolor" process here specifically and illustratively referred to involves printing of the several red records upon one film and the several blue records upon another film, and the development, coloring and physical assembly of the two films in proper register, the superposed color records then, by the subtractive method, showing a more or less accurate reproduction in color of the original object field.

The present invention will be more particularly described in its specific and illustrative form as applied to said form and arrangement of film images, although the invention is not at all necessarily limited to application to such a form of film.

In applying the usual black and white methods for forming a composite picture to such a color picture as above described, certain difficulties have been encountered, not only in matters of proper registration but also in matters relating to what may be termed color balance and image density balance. For instance, the red and blue record images of the action negative or negatives may have a color balance different from those of the background. Such substantial difference of color balance may be due to various causes. For instance, it may be caused by the background having been taken in natural light and the action having been taken by artificial light. On the other hand, the color balance in the sets of images of both action and background films may be substantially identic; but, due to great contrast between the color of the background and that of the action, in final projection one or the other or both may appear to be a color different from what it actually is. For instance, in a composite picture wherein a rider on a white horse forms the action and a forest fire forms the background, although the actual color balance in the color records of both films was substantially the same, upon projection the white horse, by contrast, appeared to be of a greenish hue.

In such a final composite color picture there may be either an actual lack of color balance or an apparent lack; and it is an object of this invention to provide a method of forming such composite color pictures by which either such actual or apparent lack of color balance is corrected. Also it is an object to provide a simple and easy method of composing the action and background images in accurate register and to control, together with the color balance control, the relative total densities of the final action and background image parts that make up the whole composite image. Broadly speaking, the object is achieved by suitably controlling the relative intensities of the prints of the several color records so as to modify or maintain the proper or desired color balance; doing this independently as regards the background color records and the action color records prior to or at the time of their composition to form the final image composite negative and prior to the time of combining the complemental color records to form the final color image. All this will be best understood from the following detailed specification wherein one concrete but merely illustrative form of the invention is set out, reference for this purpose being had to the accompanying drawings, in which:

The shade lines in Figs. 1 to 7 are intended to represent relative densities, not colors.

Figure 1:
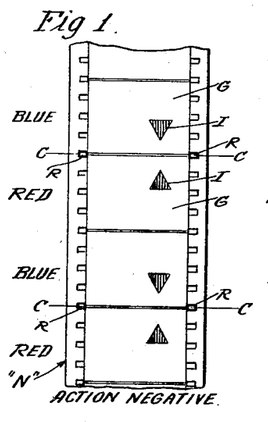
Fig. 1 is a view showing an original developed negative of an action.

Fig. 1 shows a developed action negative N which has been exposed to the action, preferably before a black or non-actinic ground so that in the developed negative the action images as shown at I will appear in a clear field or ground G. In the type of film illustrated, these action images of the adjacent blue and red records forming a pair or set are symmetrical with respect to an axis C, on or near which the registering perforations R are located. Such an arrangement of the images and the method of forming them on the negative film are the subject matter of United States Letters Patent No. 1,451,325, April 10, 1923, and are therein fully explained. The general advantage of such an arrangement of images on the film with respect to registration perforations is that differential shrinkage of different parts of a film or of the two color record films that are finally printed and physically superposed, is substantially if not wholly compensated, so that the superposed color record images are easily put into very accurate registration.

Figures 2, 3:
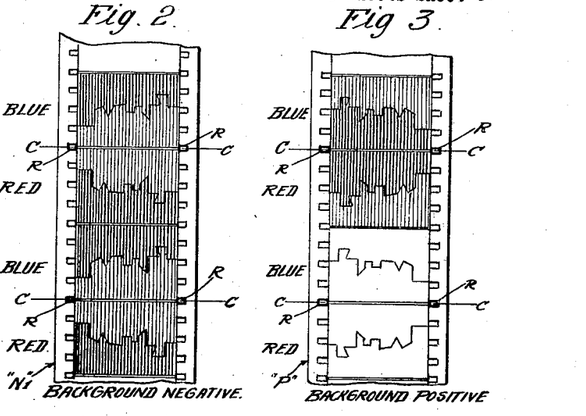
Fig. 2 shows an original developed negative of a background.
Fig. 3 shows a background positive printed from the negative of Fig. 2.

Fig. 2 shows a similar type of negative with pairs of blue and red record images of a background. The invention, as applied illustratively to negatives of this type, has the result of combining the images of negative N in accurate register with the images of negative $N^1$ and maintaining the proper or corrected color balance in both the images.

Figure 6:
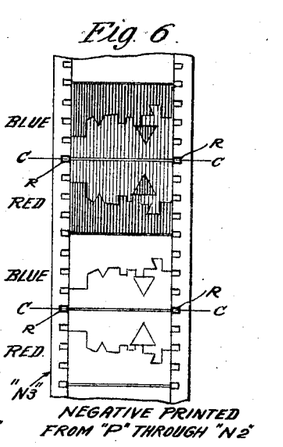
Fig. 6 shows a negative printed from the positive of Fig. 3 through the negative of Fig. 5, this figure showing said negative as it would appear if developed.

From negative $N^1$ it is typical that a background positive P will be made. In making this positive the two films $N^1$ and P will be registered by registration of perforations R, and preferably two frames will be printed simultaneously, and preferably one blue record and one red record simultaneously. Typically the printing may be of the corresponding blue and red records of a pair. Any necessary or desirable correction of color balance in the background images may be obtained at the time of printing positive P from negative $N^1$; or may be obtained, as I hereinafter describe, in a later printing from positive P onto negative $N^3$ shown in Fig. 6.

Figure 4:
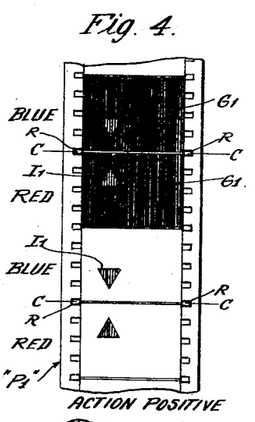
Fig. 4 shows an action positive printed from the negative of Fig. 1.

Action positive $P^1$ (Fig. 4) is made by printing from negative N, in the same manner of printing that positive P has been made from negative $N^1$. Positive $P^1$ consequently shows the characteristic positive blue and red record images of the action in an opaque or substantially opaque ground $G^1$. The color balance control hereinafter described may be exercised if desired in the printing of positive $P^1$, instead of in the subsequent step of printing from that positive. However, it may be desirable that color balance control and the consequent variation of color balance be effected in a printing from positive $P^1$, as the variation of color balance obtained during the printing of positive $P^1$ by varying the intensity of printing the respective blue and red record images might substantially vary the opaqueness of grounds in the blue and red record frames; which might result in some fogging of the background image on the final negative $N^4$, due to a relative transparency of some of the opaque grounds in positive $P^1$.

Figure 5:
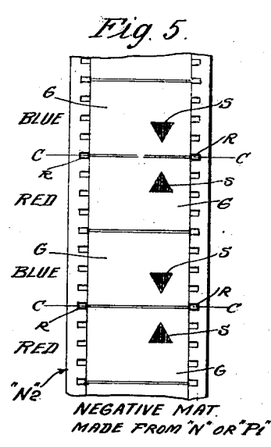
Fig. 5 shows a negative mat made from either the negative of Fig. 1 or the positive of Fig. 4.

Positive $P^1$ forms, in the particular and illustrative composition method herein explained, the action positive used in final printing upon negative $N^4$. The negative mat such as shown at $N^2$ in Fig. 5 may be made in several different manners. For instance, it may be made by coating the action images of negative N with some suitable opaque substance and preferably one that is removable; or a negative may be printed from positive $P^1$ and its action images coated in the same manner; or a negative may be printed from positive $P^1$ with a sufficiently long development to give the action images the necessary opaqueness. By whatever method negative $N^2$ is made, it will have substantially opaque action image silhouettes S in substantially transparent grounds G. And this negative, if made by steps involving printing from positive $P^1$, will be produced by the same method of registration printing as hereinbefore described, positive $P^1$ having been printed from negative N, using that same method of registration and printing.

Figure 7:
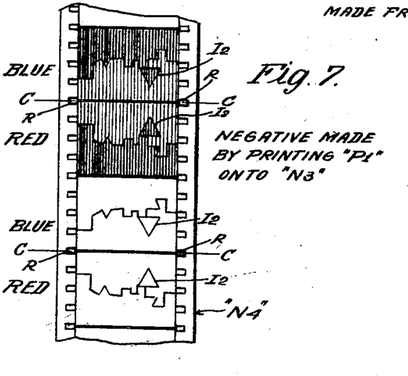
Fig. 7 shows the negative of Fig. 6 after it has been printed upon from the positive of Fig. 4 and developed.

In the next step of the method the background positive is printed upon a fresh negative $N^3$, with negative mat $N^2$ interposed, all three films being registered by the registration perforations R and the printing being preferably carried on simultaneously for pairs of blue and red record images. The result of this printing, if it were developed at this point, would show as in Fig. 6, each frame showing a negative image of the background with a clear "hole" exactly the same in size, shape and position as the action images in the original action negative N. However, negative $N^3$ is not at this time developed, but is next printed upon from positive $P^1$, using the same method of registration and exposure. Only the positive images $I^1$ of positive $P^1$ are printed as negative images $I^2$ upon negative $N^3$. Due to the exact registration obtained these images are printed upon negative $N^3$ exactly in registration with the "holes" previously left unaffected in that negative; so that upon subsequent development the negative shows as at $N^4$ in Fig. 7, with negative action images $I^2$ appearing within the negative background images.

Figure 8:
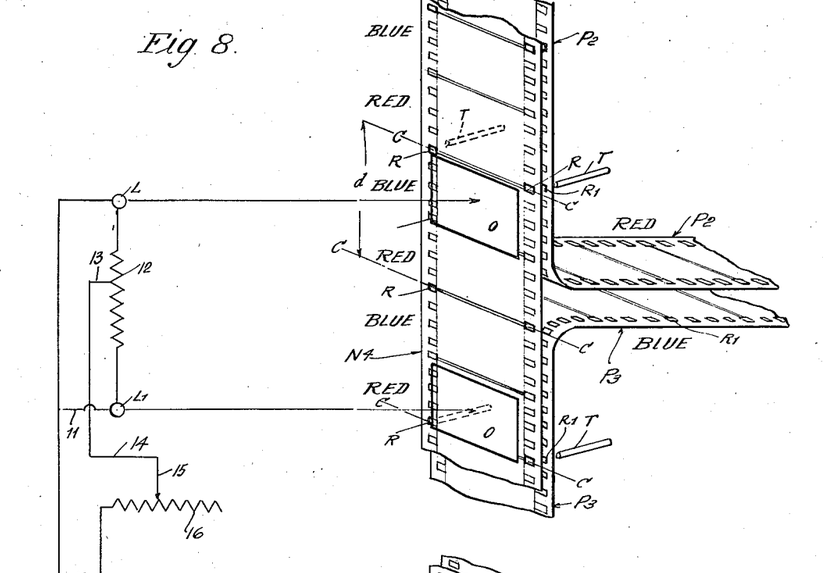
Fig. 8 is a diagram illustrating how the blue and red record images of the negative of Fig. 7 may be printed upon two separate positive films.

The typical method of now composing the composite blue and red record images of negative $N^4$ is the subject matter of United States Letters Patent No. 1,583,108, May 4, 1926. Fig. 8 shows diagrammatically the essentials of the method; said patent explains such a method in detail and describes a suitable printing machine for carrying out the method. By this method negative $N^4$ is moved longitudinally step by step, each movement being through the distance indicated by $d$ in Fig. 8—a distance corresponding to double the distance between successive frames, or equal to the distance between adjacent registration axes C. Two fresh positives $P^2$ and $P^3$ are moved behind negative $N^4$ step by step but through distances only equal to the distance between successive image frames. Thus the two positives $P^2$ and $P^3$ will have registration perforations $R^1$ at distances equal to the distances between successive frames. For purposes of illustration, the registration perforations in the various films are shown in heavier outline than are the other sprocket engaging perforations. At a time when all three films in Fig. 8 are at rest and registered by pins T in their perforations R, two image frames of negative $N^4$ are printed preferably simultaneously onto positives $P^2$ and $P^3$, one of these image frames being a red record and the other a blue record. Thus, for instance, as shown in Fig. 8, the printing of two frames may take place simultaneously through the two printing apertures shown diagra: imatically at O, two sources of light L and $L^1$ being used for that purpose. Negative $N^4$ is then moved through the distance $d$ and each positive is moved through one-half that distance, and another simultaneous printing effected. After the positives are developed they may then be assembled in registry by registering their perforations $R^1$, and the result is a composite positive having superposed accurately registering color records which by their combined effect after being properly colored show the original scenes in natural color.

Figure 9:
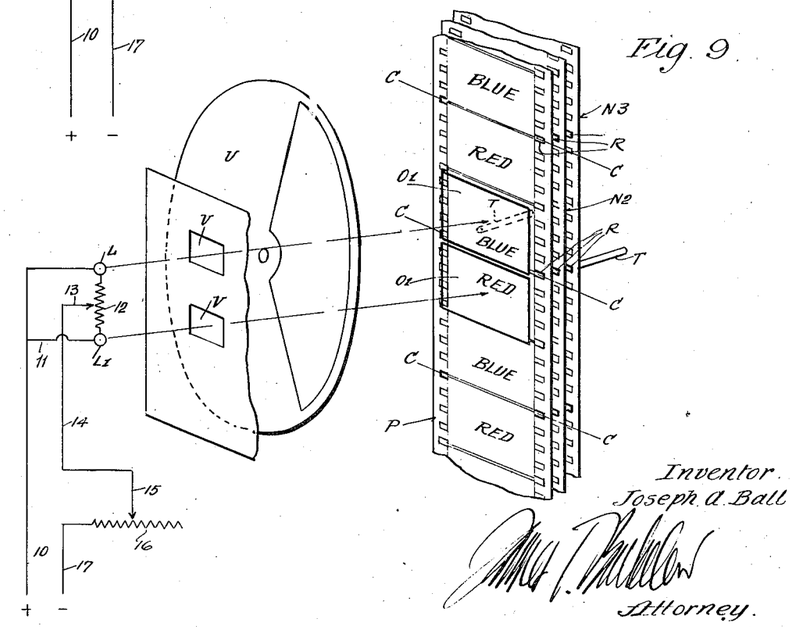
Fig. 9 is a diagram illustrating a method of printing used in both printing operations upon the negative shown in Figs. 6 and 7.

Now there are two distinct color relationships involved in the film and the method here described, in either or both of which an inaccurate or undesired color balance may occur. Either the finished film as a whole may be out of proper color balance as regards blue and red record images (and that means that both the initial background and action films are out of proper or desired color balance); or the final finished film may be in good color balance as regards one of its components, say the background images, while it is out of proper or desired color balance as regards other of its components, say the action images. And in addition to the matter of color balance there is also the matter of relative densities between the finally assembled color images of the background and that of the action. All these matters are taken care of in the manner now described:

In Fig. 9 I illustrate, for instance, the background positive P, during the operation of printing upon negative $N^3$, with negative $N^2$ interposed. During this printing, as I have said before, the three films are registered by means of their registration perforations R, registration pins T entering perforations R; and the films being moved step by step through distances equal to the distance between successive registration axes C. Fig. 9 illustrates in diagram a double aperture printer similar to the one shown in Patent No. 1,583,108, two apertures being indicated at $O^1$ in such relative position that simultaneous printing takes place of the blue and red record images of a pair. Two lights L and $L^1$ may be used for this purpose, and a single shutter U rotates one revolution for each complete cycle of movement of the films. Apertures such as those illustrated diagrammatically at V confine the light from L to one printing aperture $O^1$ and the light from $L^1$ to the other printing aperture $O^1$. Lights L and $L^1$ may be connected into such a control circuit as is described in Patent No. 1,583,108, and illustrated diagrammatically in Fig. 9. One current lead 10 may go to light L and by branch 11 to light $L^1$. Between L and $L^1$ is connected a resistance 12 having a movable contact 13 which is connected by 14 to movable contact 15 of variable resistance 16, which is connected to the other lead 17. Adjustment of the resistance at 16 varies the total intensity of the two lights L and $L^1$ and thereby varies the total intensity of printing of both the color records onto film $N^3$. Variation of the resistance at 12 varies the relative intensities of L and $L^1$ and thereby varies the relative intensities of printing of the two color records from positive P to negative $N^3$. Thus by proper control of the printing lights not only is the total density of the blue and red record prints on $N^3$ controlled (the total density that will appear when the blue and red records are superposed), but also the relative densities of those two color record prints is controlled. The first control has relation to the final relative densities between the final color-composite image of the background and that of the action. The second control has relation to the attainment of the desired color balance between the blue and red record images of the background.

When negative $N^3$ is then printed onto from positive $P^1$ to make the composite negative $N^4$, the same system of control and printing is used, the printing of the action images being controlled and regulated both as to total density and as to relative density as between the blue and red record images. In both the printings (background and action) onto the composite negative $N^4$ the total densities may be controlled so as to be substantially alike, or so as to bear any desired relationship to each other. And in both said printing operations the relative densities of the prints upon the composite negative may be controlled so as to obtain, as between the background and the action, either the same color balance or any desired difference of color balance. The result may thus be made such that in the final printing (the operation illustrated in Fig. 8) there may be no need for modifying the color balance as between the composite blue and red record images.

But the series of operations may be carried out in such a manner that a modification of color balance may in some circumstances be obtained in the operation illustrated in Fig. 8. For instance, if the background and action images are out of the desired color balance by the same amount and in the same direction, it is possible in the operations illustrated in Fig. 9 merely to control the total printing intensities to obtain the desired relative total densities of prints as between the background and action images, then correct or modify the color balance of the background and action images at once in the operation of Fig. 8. Also the same might be the case if both background and action images were out of color balance in different manners; one of them being brought into the color balance of the other by the operation illustrated in Fig. 9, and then, both of them being in the same condition as regards color balance, the proper color balance being obtained by proper control in the operation illustrated in Fig. 8. For this purpose the lights L and L¹ are indicated as being controllable in Fig. 8 in the same manner as in Fig. 9.

But in most cases the control of both color balance and of the relative total densities are carried out in the operations of printing onto the composite negative N⁴ by the method illustrated in Fig. 9. The proper total densities and also the proper relative color balance having there been obtained, it is then only necessary to control the operation of Fig. 8 specifically as regards total densities; but any slight variation from the proper color balance of the film as a whole, if any be observed in negative N⁴, may be afterwards corrected in the operation of Fig. 8. Patent No. 1,583,108 also sets out a method and apparatus for obtaining automatic control of the light intensities and thus of both the total density and relative densities of the prints.

The specific method of printing illustrated in Fig. 9 involving a double aperture printer, a blue and a red record being printed preferably simultaneously, and registration being obtained by means of the registration apertures on or near the axis of symmetry of pairs of images, substantially eliminates all the lack of registration in the images of the final double thickness film made up of positives P² and P³. This is particularly important in making up a composite background and action picture as herein described, because it is very commonly the case that the original background negative may be taken at a time far removed from that at which the original action negative is taken; and, as is well known, the shrinkage of motion picture film is governed very largely by its age. Thus in a typical instance the original background negative may be relatively much older and therefore much more shrunk than the original action negative, and in any ordinary method of printing the unexposed spaces in negative N³ and prints upon that negative from positive P¹ would fail to register. The method herein described completely takes care of all such matters of registration, because the amount of shrinkage in the distance between any of the images and its corresponding axis of registration or registration perforations is necessarily very minute.

Figure 10:
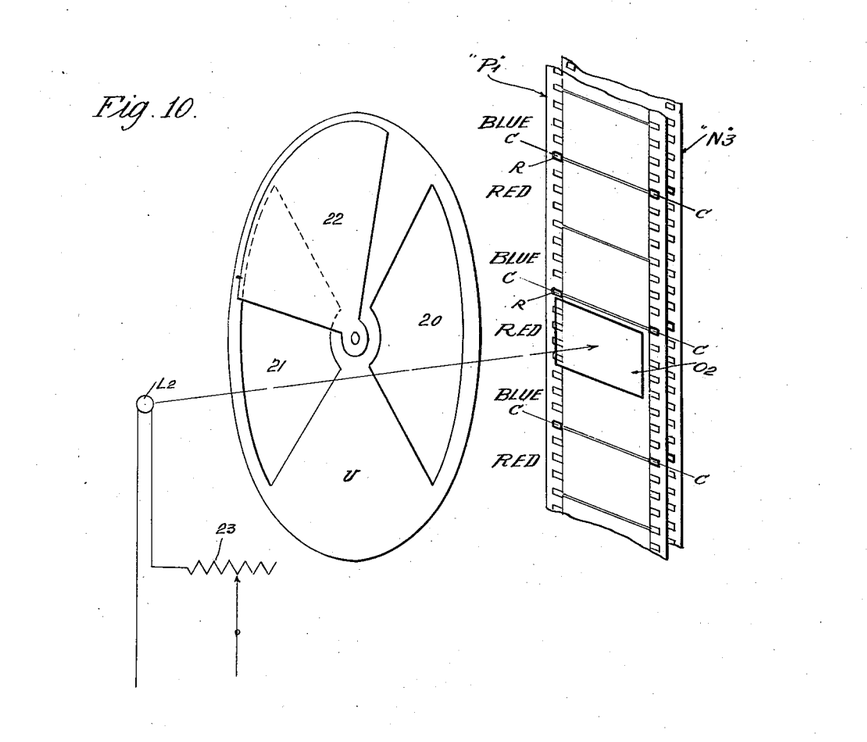
Fig. 10 is a diagram illustrating a modified method that may be used for said printings.

However, in cases where the two original negatives have shrunk substantially equally, such a method of printing as shown in Fig. 10 may be used. Here, for instance, is illustrated the positive P¹ and negative N³ being printed from that positive. A single printing aperture O² is employed and the two films may be moved step by step through the printer in distances equal to distances between successive frames, one frame being printed at a time. A shutter U may then be used having two apertures 20 and 21, one at least of which has an adjustable vane 22 by which it may be closed down to any desired extent. Shutter U will in this case be rotated one-half a revolution for each complete movement of the film, so that first the blue record will be printed through one opening of the shutter and next the red record will be printed through the other opening of the shutter. Control of the relative shutter openings will, in this case, control the color balance between the printings of the red and blue records, while control of the intensity of the single light L², as may be had by resistance 23, will control the total density of printing of both color records.

I claim:

1. The method of making a composite color picture, that includes exposing actinic surfaces separately to object scenes desired to be composed in a single picture and obtaining on said surfaces a plurality of sets of complemental color record images representing different color aspects of the respective object scenes, then combining the several corresponding color record images of all said surfaces on a single actinic surface, so that each color record image is then a composite of the several original object scenes, and finally combining all the composite images in register.

2. The method of making a composite color picture, that includes exposing actinic surfaces separately to object scenes desired to be composed in a single picture and obtaining on said surfaces a plurality of sets of complemental color record images representing different color aspects of the respective object scenes, then combining the several corresponding color record images of all said surfaces on a single actinic surface, so that each color record image is then a composite of the several original object scenes, and finally combining on a single actinic surface all the composite images in register.

3. The method of making a composite color picture, that includes exposing two actinic surfaces separately to object scenes desired to be composed in a single picture and obtaining on said surfaces a plurality of sets of complemental color record images representing different color aspects of the respective object scenes, then combining the several corresponding color record images of the two said surfaces on a single actinic surface, so that each color record image is then a composite of the two original object scenes, and finally combining all the composite images that record the same color.

4. The method of making a composite color picture, that includes exposing two actinic surfaces separately to object scenes desired to be composed in a single picture and obtaining on each surface a plurality of sets of complemental color record images representing different color aspects of the respective object scenes, then combining the several corresponding color record images of the two said surfaces on a single actinic surface, so that each color record image is then a composite of the two original object scenes, and finally combining on a single actinic surface all the composite images that record the same color.

5. The method of making a composite color picture, that includes exposing actinic surfaces separately to object scenes desired to be composed in a single picture and obtaining on said surfaces sets of complemental color record images representing different color aspects of the respective object scene, then combining the several corresponding color record images of all said surfaces on a single actinic surface, so that each color record image is then a composite of the several original object scenes, and finally combining all the composite images in register.

6. The method of making a composite color picture, that includes exposing actinic surfaces separately to object scenes desired to be composed in a single picture and obtaining on said surfaces sets of complemental color record images representing different color aspects of the respective object scene, then combining the several corresponding color record images of all said surfaces on a single actinic surface, so that each color record image is then a composite of the several original object scenes, and finally combining on a single actinic surface all the composite images in register.

7. The method of making a composite color picture, that includes exposing two actinic surfaces separately to object scenes desired to be composed in a single picture and obtaining on each surface a set of complemental color record images representing different color aspects of the respective object scene, then combining the several corresponding color record images of the two said surfaces on a single actinic surface, so that each color record image is then a composite of the two original object scenes, and finally combining all the composite images that record the same color.

8. The method of making a composite color picture, that includes exposing two actinic surfaces separately to object scenes desired to be composed in a single picture and obtaining on each surface a set of complemental color record images representing different color aspects of the respective object scene, then combining the several corresponding color record images of the two said surfaces on a single actinic surface, so that each color record image is then a composite of the two original object scenes, and finally combining on a single actinic surface all the composite images that record the same color.

9. The method of making a composite color picture, that includes exposing two actinic surfaces separately to two object scenes desired to be composed in a single picture and obtaining on each surface two complemental color record images representing different color aspects of the respective object scene, then combining on a single actinic surface the each pair of color record images that record the same color, so that both color record images are then composites of the two original object scenes, and finally combining the two composite images.

10. The method of making a composite color picture, that includes exposing two actinic surfaces separately to two object scenes desired to be composed in a single picture and obtaining on each surface two complemental color record images representing different color aspects of the respective object scene, then combining on a single actinic surface the each pair of color record images that record the same color, so that both color record images are then composites of the two original object scenes, and finally combining on a single actinic surface the two composite images.

11. The method of making a composite color picture, that includes exposing actinic surfaces separately to object scenes desired to be composed in a single picture and obtaining on said surface sets of complemental color record images representing different color aspects of the respective object scene, transposing and composing the several corresponding color record images from said actinic surfaces onto another actinic surface by printing, controlling the intensities of said printings of all the color records and thereby controlling the total density of print from all the color records of each first mentioned actinic surface and also the relative density of print from the complemental color records of the several first mentioned actinic surfaces; whereby on the second mentioned actinic surface a set of complemental color record images is obtained which are composite images of the original scenes and wherein the color balance and image densities are controlled as to each of the several composite image parts; and finally combining the composite images.

12. The method of making a composite color picture that includes exposing actinic surfaces separately to object scenes desired to be composed in a single picture and obtaining on said surface sets of complemental color record images representing different color aspects of the respective object scene, transposing and composing the several corresponding color record images from said actinic surface onto another actinic surface by printing, controlling the intensities of said printings of all the color records and thereby controlling the total density of print from all the color records of each first mentioned actinic surface and also the relative density of print from the complemental color records of the several first mentioned actinic surfaces; whereby on the second mentioned actinic surface a set of complemental color record images is obtained which are composite images of the original scenes and wherein the color balance and image densities are controlled as to each of the several composite image parts; and finally combining the composite images on a single actinic film by printing and superposing, and controlling the intensities of printings onto said film whereby the color balance obtained is finally controlled.

13. The method of making a composite color picture, that includes exposing two films separately to two object scenes desired to be composed in a single picture and obtaining on each film a pair of complemental color record images representing different color aspects of the respective object scene, transposing and composing the two sets of corresponding color record images from the films onto another film by printing, controlling the intensities of said printings of all the color record images and thereby controlling the total density of print from the two images on each first mentioned film and also the relative density of print from the two said images, whereby the second mentioned film then carries a pair of complemental color record images each of which is a composite of the original scenes and wherein the color balance and image densities are controlled as to each of the two composite image parts; and finally combining the composite images on a single film by printing and superposing, and controlling the intensities of printings so that the color balance finally obtained is controlled.

14. The method of making a composite color picture, that includes exposing two films separately to two object scenes desired to be composed in a single picture and obtaining on each film a pair of complemental color record images representing different color aspects of the respective object scene, transposing and composing the two sets of corresponding color record images from the film onto another film by printing, controlling the intensities of said printings of all the color record images and thereby controlling the total density of print from the two images on each first mentioned film and also the relative density of print from the two said images, whereby the second mentioned film then carries a pair of complemental color record images each of which is a composite of the original scenes and wherein the color balance and image densities are controlled as to each of the two composite image parts; and finally combining the composite images.

15. The method of making a composite color negative, that includes exposing actinic surfaces separately to object scenes desired to be composed in a single negative and obtaining on said surfaces a plurality of sets of complemental color record images representing different color aspects of the respective object scene, then combining the several corresponding color record images of all said surfaces on a single actinic surface, so that each color record image is then a composite of the several original object scenes.

16. The method of making a composite color negative, that includes exposing two actinic surfaces separately to object scenes desired to be composed in a single negative and obtaining on each surface a set of complemental color record images representing different color aspects of the respective object scene, then combining the several corresponding color record images of the two said surfaces on a single actinic surface, so that each color record image is then a composite of the original object scenes.

17. The method of making a composite color negative that includes exposing actinic surfaces separately to object scenes desired to be composed in a single negative and obtaining on said surfaces sets of complemental color record images representing different color aspects of the respective object scene, transposing and composing the several corresponding color record images from said actinic surfaces onto another actinic surface by printing, controlling the intensities of said printings of all the color records and thereby controlling the total density of print from all the color records of each first mentioned actinic surface and also the relative density of print from the complemental color records of the several first mentioned actinic surfaces; whereby on the second mentioned actinic surface a set of complemental color record images is obtained which are composite images of the original scenes and wherein the color balance and image densities are controlled as to each of the several composite image parts.

18. The method of making a composite color negative, that includes exposing two films separately to two object scenes desired to be composed in a single negative and obtaining on each film a pair of complemental color record images representing different color aspects of the respective object scene, transposing and composing the two sets of corresponding color record images from the film onto another film by printing, controlling the intensities of said printings of all the color record images and thereby controlling the total density of print from the two images on each first mentioned film and also the relative density of print from the two said images, whereby the second mentioned film then carries a pair of complemental color record images each of which is a composite of the original scenes and wherein the color balance and image densities are controlled as to each of the two composite image parts.

19. The method of making a composite color picture negative from two negatives each of which carries a pair of complemental color record images representing different color aspects of object scenes desired to be composed in a single negative, said method including transposing and composing the two sets of corresponding color record images from the two films onto another film by printing, controlling the intensities of said printings of all the color record images and thereby controlling the total density of printing from the two images on each first mentioned film and also the relative density of print from the two said images, whereby the second mentioned film then carries a pair of complemental color record images each of which is a composite of the original scenes and wherein the color balance and image densities are controlled as to each of the two composite image parts.

In witness that I claim the foregoing I have hereunto subscribed my name this 28th day of August, 1926.

JOSEPH A. BALL.